United States Patent [19]
Yarnall, Sr. et al.

[11] Patent Number: 5,781,113
[45] Date of Patent: Jul. 14, 1998

[54] ELECTRONIC CONFINEMENT SYSTEM FOR ANIMALS USING MODULATED RADIO WAVES

[76] Inventors: Robert G. Yarnall, Sr.; Robert G. Yarnall, Jr., both of P.O. Box 758, Kimberton, Pa. 19442

[21] Appl. No.: 776,733
[22] PCT Filed: Aug. 4, 1995
[86] PCT No.: PCT/US95/09950
§ 371 Date: Feb. 3, 1997
§ 102(e) Date: Feb. 3, 1997
[87] PCT Pub. No.: WO96/04628
PCT Pub. Date: Feb. 15, 1996

Related U.S. Application Data

[63] Continuation-in-part of Ser. No. 286,668, Aug. 5, 1994, Pat. No. 5,610,588, and a continuation-in-part of Ser. No. 414,912, Mar. 31, 1995, Pat. No. 5,565,850.

[51] Int. Cl.⁶ ............................................. G08B 23/00
[52] U.S. Cl. .................... 340/573; 119/721; 119/908
[58] Field of Search ............................ 340/573; 119/721, 119/908

[56] References Cited

U.S. PATENT DOCUMENTS

| | | | |
|---|---|---|---|
| 4,208,658 | 6/1980 | Fujiki et al. | 342/70 |
| 4,225,206 | 9/1980 | Roman, Jr. | 439/274 |
| 4,229,724 | 10/1980 | Marcus | 340/988 |
| 4,242,668 | 12/1980 | Herzog | 340/539 |
| 4,297,684 | 10/1981 | Butter | 340/557 |
| 4,371,934 | 2/1983 | Wahl et al. | 364/444 |
| 4,480,310 | 10/1984 | Alvarez | 364/450 |
| 4,494,553 | 1/1985 | Sciarra et al. | 128/721 |
| 4,656,476 | 4/1987 | Tavtigian | 340/993 |
| 4,675,656 | 6/1987 | Narcisse | 340/539 |
| 4,733,633 | 3/1988 | Yarnall, Sr. et al. | 340/573 X |
| 4,745,882 | 5/1988 | Yarnall, Sr. et al. | 340/573 X |
| 4,898,120 | 2/1990 | Brose | 340/573 X |
| 4,967,695 | 11/1990 | Giunta | 119/721 |
| 4,996,945 | 3/1991 | Dix, Jr. | 119/721 |
| 5,067,441 | 11/1991 | Weinstein | 340/573 X |
| 5,121,711 | 6/1992 | Aine | 340/573 X |
| 5,161,485 | 11/1992 | McDade | 340/573 X |
| 5,170,149 | 12/1992 | Yarnall, Sr. et al. | 340/573 |
| 5,207,178 | 5/1993 | McDade et al. | 340/573 X |
| 5,241,923 | 9/1993 | Janning | 340/573 X |
| 5,266,944 | 11/1993 | Carroll et al. | 340/573 X |
| 5,307,053 | 4/1994 | Wills et al. | 340/573 |
| 5,322,034 | 6/1994 | Willham et al. | 340/573 X |
| 5,335,664 | 8/1994 | Nagashima | 128/696 |
| 5,425,330 | 6/1995 | Touchton et al. | 119/721 |
| 5,435,271 | 7/1995 | Touchton et al. | 119/721 |
| 5,460,124 | 10/1995 | Grimsley et al. | 340/573 X |
| 5,565,850 | 10/1996 | Yarnall, Jr. et al. | 340/573 |
| 5,572,401 | 11/1996 | Carroll | 361/683 |
| 5,610,588 | 3/1997 | Yarnall, Jr. et al. | 340/573 |

OTHER PUBLICATIONS

"Invisible Fencing" product brochure, coversheet and p. 5, 1991.
International Search Report, Appl. No. PCT/US95/09950, 1 page, 12 Oct. 1995.

*Primary Examiner*—Thomas J. Mullen, Jr.
*Attorney, Agent, or Firm*—Ratner & Prestia

[57] ABSTRACT

An animal confinement arrangement including a home base for transmitting a modulated signal and a receiver for receiving the modulated signal. The received modulated signal is demodulated using a demodulator. The demodulated signal is compared to a reference signal to produce a comparator signal indicating if the received modulated signal was transmitted by the home base. Also provided is variable sensitivity deterrent circuitry which is responsive to a strength level of the received modulated signal and to the comparator signal for producing a variable deterrent signal which is applied to an animal if the comparator signal indicates that the received modulated signal was transmitted by the home base. Communication circuitry and an antenna design allow the user to communicate with the animal. A low battery strength indicator for the battery in the receiver is also provided.

1 Claim, 7 Drawing Sheets

# ELECTRONIC CONFINEMENT SYSTEM FOR ANIMALS USING MODULATED RADIO WAVES

This patent application is a U.S. national phase application of PCT/US95/09950, filed Aug. 4, 1995, which is a continuation-in-part application of parent applications Ser. No. 08/286,668 filed on Aug. 5, 1994, now U.S. Pat. No. 5,610,588, and a continuation-in-part of Ser. No. 08/414,912 filed on Mar. 31, 1995, now U.S. Pat. No. 5,565,850.

FIELD OF THE INVENTION

This invention relates to an electronic confinement arrangement for animals, and more particularly to a wire fence confinement arrangement which utilizes a boundary antenna to transmit a modulated signal to activate a receiver positioned on an animal.

BACKGROUND OF THE INVENTION

One system for accomplishing the confinement of an animal is disclosed in U.S. Pat. No. 5,170,149 entitled CONFINEMENT ARRANGEMENT FOR ANIMALS and issued to Yarnall, Sr. et al. This and other conventional systems mount a receiver on a collar. The collar delivers a shock to an animal wearing the collar when the animal is in relatively close proximity to a perimeter antenna wire. The conventional systems are unintentionally activated, however, by common and naturally occurring sources of unmodulated radio frequencies. These sources include, for example, lightning and household electrical motors such as those motors used in hair dryers and blenders.

Another exemplary conventional system is described in U.S. Pat. No. 4,898,120 entitled ANIMAL TRAINING AND RESTRAINING SYSTEM and issued to Brose. The '120 patent describes a system which includes a transmitter/receiver mounted on an animal's collar for transmitting a series of pulses. A control unit receives the transmitted pulses and provides them to an analog-to-digital (A/D) converter for converting the transmitted pules to digital form based on the amplitude of the received pulses. A central processing unit (CPU) in the control unit uses the digital signals to define the average strength of the transmitted pulses to ascertain if the animal has approached a predetermined distance from the transmitter. The system does not distinguish the transmitted signal, however, from naturally occurring and common sources of unmodulated radio frequencies.

Another exemplary conventional system is described in U.S. Pat. No. 4,967,695 entitled SYSTEM FOR CONTROLLING THE MOVEMENT OF AN ANIMAL and issued to Giunta. The '695 patent describes a confinement system which uses three separate antennas to overcome the problem of a temporary loss of signal when the animal changes direction of travel. The three separate antennas are linked to three individual measuring circuits, which are then connected to a comparator circuit that is linked to a switch circuit. The system has a comparator circuit and a large number of antennas and measuring circuits—all of which must fit inside the animal's receiver unit. These components may increase the size of the receiver unit. In addition, there is an increased drain on the battery used to power the receiver because of the increased number of electronic components that are located in the animal's collar unit. Finally, the manufacturing cost of the animal's receiver unit may be increased.

The foregoing illustrates the limitations known to exist in present confinement systems. Thus, it is apparent that it would be advantageous to provide an alternative confinement system which will account for common and naturally occurring sources of unmodulated radio frequencies and will include an animal's receiver unit that can overcome temporary loss of signal without requiring extensive additional circuitry. Accordingly, these are the principal objects of the present invention.

SUMMARY OF THE INVENTION

To achieve these and other objects, and in view of its purposes, the present invention provides an animal confinement arrangement including a home base for transmitting a modulated signal and a receiver for receiving the modulated signal. The received modulated signal is demodulated using a demodulator. The demodulated signal is compared to a reference signal to produce a comparator signal indicating whether the received modulated signal was transmitted by the home base. Also provided is deterrent circuitry which is responsive to a strength level of the received modulated signal for producing a deterrent signal. The deterrent signal is applied to an animal if the comparator signal indicates that the received modulated signal was transmitted by the home base.

In another exemplary aspect of the present invention, the modulated signal transmitted from the home base is encoded with a digital signal. The received encoded modulated signal is demodulated and the digital signal recovered in the receiver. The deterrent, in response to the strength level of the received modulated signal and the digital code, produces the deterrent signal. The deterrent signal is applied to the animal if the digital signal was transmitted from the home base.

In another exemplary aspect of the present invention, a confinement arrangement including a home base transmitter for transmitting modulated signals is provided. A first wire defines a confinement area and receives and emits a first modulated signal. A second wire within the confinement area and adjacent to the home base receives and emits a second modulated signal. A receiver attached to an animal detects a first, low strength level of the first modulated signal from the first wire and activates deterrent devices on the collar. If the animal continues toward the first wire, the receiver also detects a second, higher strength level of the first modulated signal from the first wire and activates an alarm signal to the home base and disconnects the deterrent circuits. If the animal approaches the second wire, the receiver detects the second modulated signal and reactivates the deterrent circuits, thereby reconfining the animal.

In another exemplary aspect of the present invention, an adjustable signal detection circuit and an adjustable spike out circuit are provided in the animal's receiver. The adjustable signal detection circuit permits the sensitivity of the receiver to be adjusted to activate the deterrent circuits at different distances from the first wire. The level of the deterrent is also adjustable to provide varying degrees of deterrence.

In still another exemplary aspect of the present invention, a portable collar communicator is included in the receiver mounted on the animal's collar. The animal's owner is able to communicate with the animal via a microphone positioned at the home base or through a portable unit. The output of the microphone is converted, amplified, combined with a modulated frequency, and then transmitted to the animal's receiver. In response to detection of the owner's modulated voice signal, a collar communicator circuit in the receiver converts the transmitted voice signal so the animal can hear the owner's transmitted voice. The collar communicator circuit includes a power saver circuit permitting use of the collar communicator circuit without consuming excessive energy from the receiver's power supply.

In another exemplary aspect of the present invention, the animal's receiver includes an antenna for detecting the modulated signals from the first wire and the second wire. The antenna includes a ferrite core with four protruding legs arranged at an angle of substantially 90 degrees to each other. Each of the four legs are wound with a continuous length of wire. The antenna improves reception when the animal is in full, unrestrained motion.

In another exemplary aspect of the present invention, a low battery strength level indicator is provided. When the intensity of a signal received from the collar unit falls below a predetermined value, an indicator warns the owner of an imminent power failure of the receiver mounted on the animal's collar. The system also includes a number of low battery indicators positioned at the base station which are responsive to different modulated signals transmitted by animal receivers. Each animal receiver transmits respectively different modulated signals indicative of a low battery level for the different receivers.

The foregoing and other aspects of the present invention will become apparent from the following detailed description of the invention when considered in conjunction with the accompanying drawing.

DESCRIPTION OF PREFERRED EMBODIMENTS AND BEST MODE

In general terms, the confinement system for animals of the present invention operates by transmitting a first, predetermined modulated signal to a receiver mounted on an animal's collar. The modulated signal is demodulated by the receiver and it is determined if the received signal is the modulated signal. If the demodulated and reference signals are similar, then the signal strength of the first signal is used to determine whether the animal is close to a boundary area. If the modulated and reference signals are not similar, the first signal is ignored.

Figure 1:
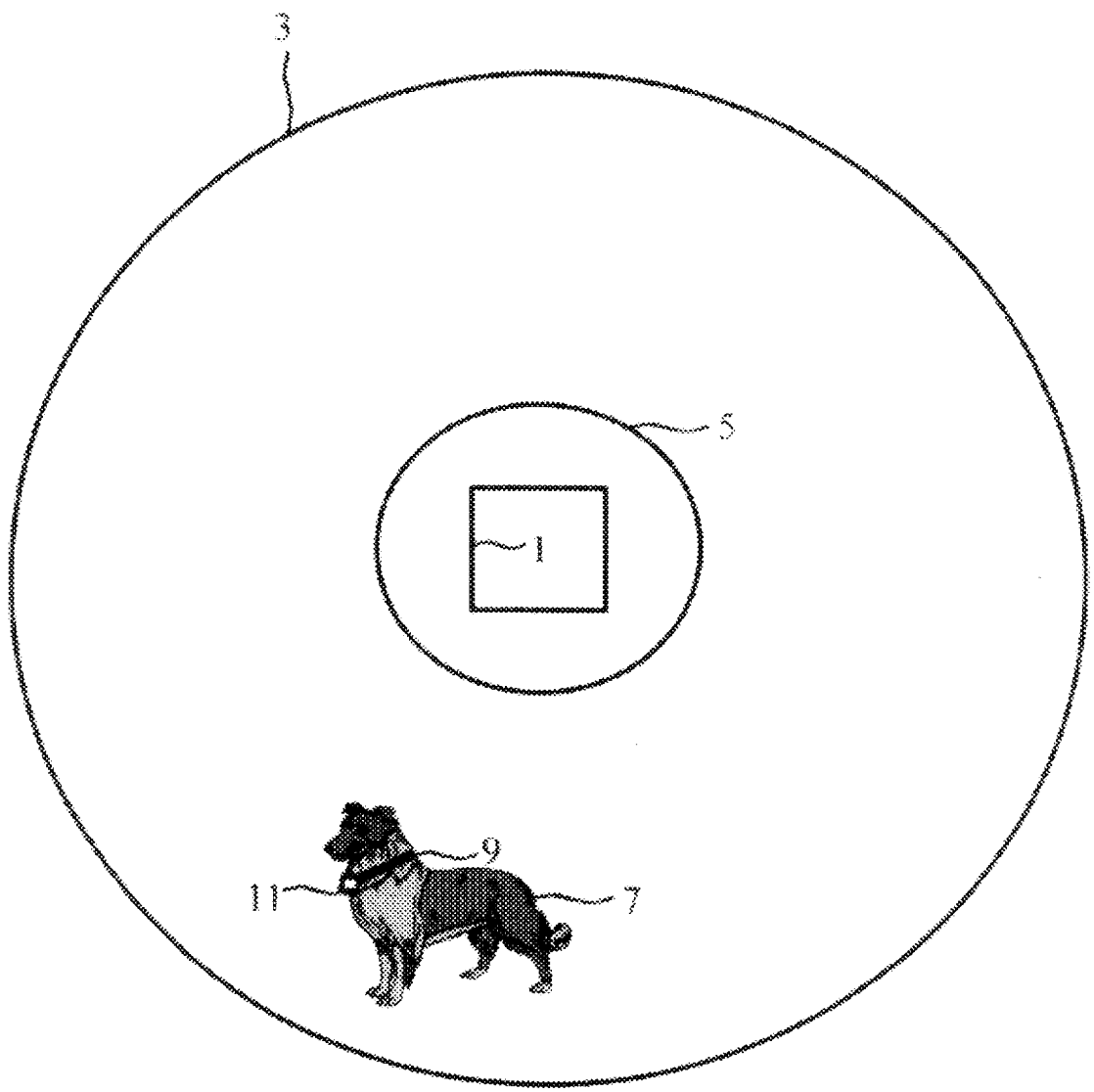
FIG. 1 is a schematic illustration of an exemplary confinement system in accordance with the present invention.

Referring to FIG. 1, there is shown a home base 1 which includes a transmitter for transmitting a first, predetermined modulated signal (A) and a second, predetermined modulated signal (B) which is different from the first, predetermined modulated signal (A). A first signal-emitting wire 3 responsive to the first signal (A) is disposed around a confinement area. Wire 3 can be above ground or buried under ground.

A second signal-emitting wire 5, responsive to the second signal (B), is disposed within the confinement area around home base 1. Wire 5 can circle home base 1 or be positioned adjacent to home base 1. Wire 5 can be above ground or buried under ground.

An animal 7 to be kept within the confinement area wears a collar 9 that carries a receiver 11. Receiver 11 is responsive to the first and second signals (A) and (B). First signal (A) is broadcast to wire 3, and is emitted therefrom. The strength of the emitted signal varies with the distance from wire 3, as is well known. As the animal 7 approaches wire 3, the strength of the signal continuously increases and as the animal 7 departs from wire 3 the strength of the signal decreases. Receiver 11 has a deterrent circuit responsive to a first level of strength of signal (A), preferably between 0.001 and 0.005 watts. Once the first level of strength of signal (A) is detected, the deterrent circuit produces a deterrent, including electrical shock and audio, which both act upon the animal to, it is hoped, drive the animal back toward the center of the confinement area.

If the animal 7 ignores the deterrent and continues toward wire 3, the receiver 11 activates its alarm and disconnect circuit. The alarm and disconnect circuit are responsive to a second level of strength of first signal (A), preferably 0.01 to 0.05 watts. After the second strength level of first signal (A) is detected, the disconnect and alarm circuit disconnects the deterrent circuit, so that the animal 7 no longer receives the deterrent, and it may wander outside the confinement area. The term "disconnect" herein refers to an electrical deactivation. Simultaneously with the disconnect, the collar alarm broadcasts an alarm activation signal back to the home base 1, warning the owner that the animal 7 has ignored the deterrent and is escaping.

After the animal 7 escapes, it may desire to return to the home base 1 or to the confinement area, due to habit or due to action of the owner. Collar 9 carries a reconnect circuit responsive to second signal (B). Once the animal 7 approaches wire 5, the reconnect circuit reactivates the disconnected deterrent circuit, and the animal 7 is reconfined.

Figure 2:
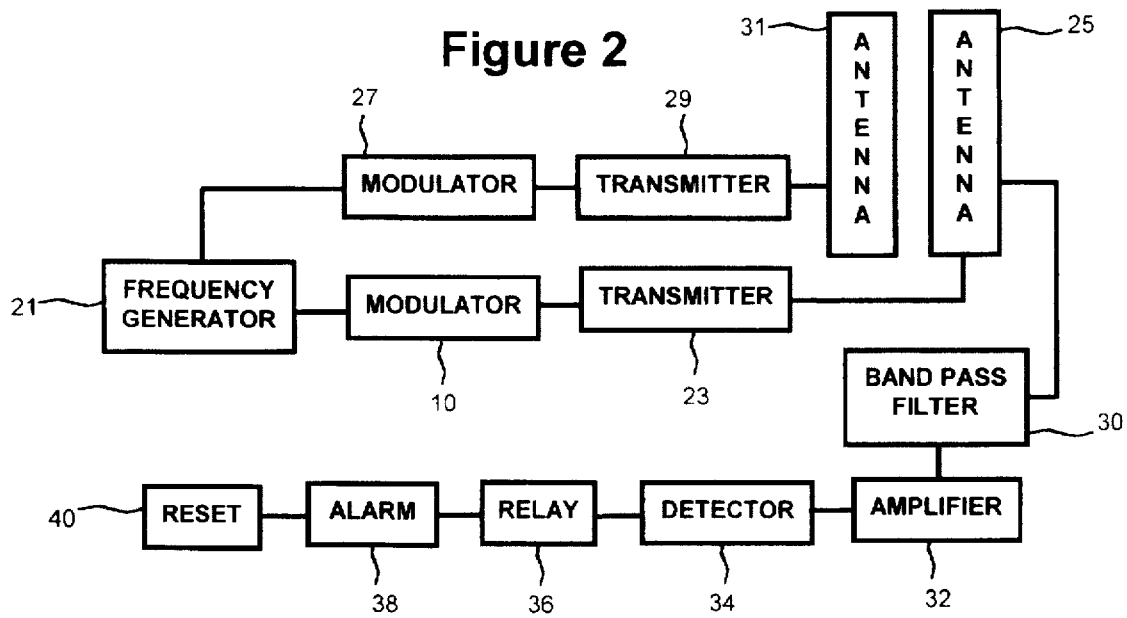
FIG. 2 is an exemplary circuit of a home base transmitter and alarm circuit in accordance with the present invention.

Referring to FIG. 2, an exemplary circuit for home base 1 is shown. The home base is powered by DC electricity. Home base 1 includes frequency generator 21 which generates an oscillating signal of predetermined frequency, for example, 30 KHz. A portion of the output of frequency generator 21 is directed to modulator 27, which shapes the curve of second signal (B), as is well known. Second signal (B) is then transmitted by second transmitter 29 to antenna 31, also referred to herein as wire 5. Wire 5 then emits second signal (B), which is received and processed by the receiver 11 in collar 9, as hereinafter described.

Wire 3 emits first signal (A) which is received and processed by the receiver 11 in collar 9. First signal (A) is a modulated signal which is generated by modulating a carrier signal, for example, the output signal of the frequency generator 21, with a modulating signal which is, for example, an analog signal or a digital signal. Modulated first signal (A) is generated by modulator 10. Modulated first signal (A) is then transmitted by first transmitter 23 to antenna 25, also referred to herein as wire 3.

As is described later, the first modulated signal is demodulated by a demodulator in the receiver 11 in collar 9 and compared to a reference signal or is examined to determine if the signal received by the receiver 11 in collar 9 has been transmitted from wire 3. As a result, the receiver 11 in collar 9 can prevent inadvertent activation of the deterrent circuit caused by radio waves generated by common and natural sources as well as signals generated by other confinement systems which are received by receiver 11 in collar 9.

Antenna 25 is also used to receive an alarm activation signal broadcast by the collar alarm to warn the owner that the animal has ignored the deterrent and is escaping. This alarm signal passes through a band pass filter 30 that only allows certain frequency signals to pass. The output signal of band pass filter 30 is provided to amplifier 32 which amplifies the signal. Detector 34 is activated by a signal of a certain signal strength. The output of detector 34 is coupled to relay 36, which is, in turn, coupled to alarm 38. The alarm 33 is activated to warn the owner of the escaping animal. The alarm may then be reset using reset circuit 40.

Modulator 10 can modulate signal (A) using a variety of modulation techniques including, for example, amplitude modulation, frequency modulation, pulse modulation and phase modulation, as are known.

First and second transmitters, 23 and 29, each have means for increasing or decreasing the signal strength, so as to increase the size of the field of transmitted and emitted signals, as is well known.

Figure 3:
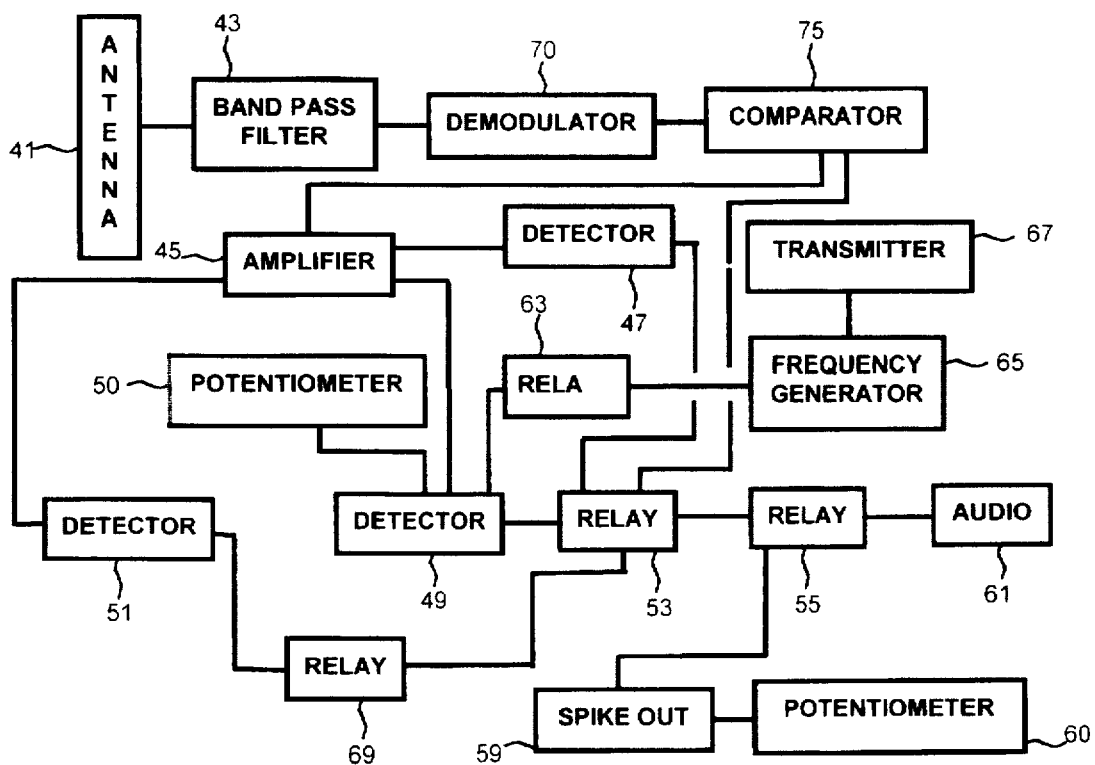
FIG. 3 is an exemplary circuit for a receiver with a deterrent circuit, an alarm circuit, and a deterrent control circuit in accordance with the present invention.

Referring to FIG. 3, an exemplary circuit for the receiver 11 in collar 9 is shown. As the animal 7 nears wire 3, the first strength level signal of modulated first signal (A) is detected by antenna 41 in receiver 11 in collar 9. First signal (A) passes through a band pass filter 43 that allows only the pre-designated frequency of 30 KHz to pass or frequencies around the pre-designated frequency of 30 KHz to pass. Depending on the selected modulation technique, the frequency of first signal (A) may vary. Accordingly, the band pass filter will be selected to pass frequencies which include the frequency or frequency range of first signal (A).

The output signal of band pass filter 43 is provided to (1) demodulator 70 which demodulates first signal (A) to extract the modulating signal.. After signal (A) is demodulated, it is provided to comparator 75 which compares the demodulated signal (A') to a reference signal to determine if the demodulated signal is first signal (A) transmitted by wire 3. If the demodulated signal is the correct signal, then comparator 75 provides the first demodulated signal (A') to amplifier 45. Modulated first signal (A) and demodulated first signal (A') have substantially the same signal strength.

If the demodulated signal is not the correct signal, then comparator 75 ignores the input signal for a period of time. After the period of time has elapsed, the comparator compares the currently received signal to the reference signal to determine if the correct signal is received.

Amplifier 45 amplifies the demodulated first signal (A') up to 100 times, so as to energize the remainder of the circuit. The output of amplifier 45 is divided evenly among detectors 47, 49, and 51. Detector 47 is activated only in response to demodulated signal (A') corresponding to modulated signal (A) which has a received signal strength of between 0.001 and 0.005 watts. This signal level is detected when the animal is still some distance from wire 3. Detectors 49 and 51 are not activated by the first strength level of first signal (A). The output of detector 47 is coupled to first relay 53, which is, in turn, coupled to second relay 55.

Second relay 55 activates an electrical spike circuit 59 and an audio signal circuit 61 to produce an electrical shock and a sound unpleasant to the animal. Circuits to produce the electrical shock and audio are well known in the art and are described, for example, in U.S. Pat. No. 4,733,633 entitled ELECTRONIC CONFINEMENT ARRANGEMENT FOR ANIMALS and issued to Yarnall et al., which is incorporated herein by reference.

If animal 7 continues toward wire 3, second strength level of signal (A) is detected by detector 49. Detector 49 is activated only in response to demodulated signal (A') corresponding to modulated signal (A) having a received signal strength of between 0.01 and 0.05 watts. The output of detector 49 is coupled to third relay 63, which in turn activates frequency generator 65 to broadcast an alarm via transmitter 67 back to home base 1. Frequency generator 65 may be any type of generator capable of generating an oscillating signal at a predetermined frequency, preferably 50 KHz. Detector 49 is also coupled to first relay 53, which then activates second relay 55 to deactivate the electrical and audio circuits, 59 and 61, respectively.

After animal 7 returns to the proximity of second emitting wire 5, detector 51 detects the presence of modulated signal (B). Output of detector 51 acts upon fourth relay 69 to activate first relay 53, which activates the second relay 55, to reactivate the deterrent circuits of electrical shock and audio.

Alternatively, the received signal could be provided directly to amplifier 45. In this case, comparator 75 acts upon the second relay 55 directly or through relay 53 or detector 49 as illustrated by the broken line in FIG. 3, for example, to deactivate the deterrent circuits of electrical shock and audio for a specified period of time if the correct signal is not received.

Although signals (A) and (B) are transmitted at or around 30 KHz, other radio frequencies or bands of frequencies could be used. Likewise, the alarm signal frequency of 50 KHz could be another frequency. Also, while we have disclosed only a single frequency or band of frequencies for signals (A) and (B), a plurality of individual frequencies or bands of frequencies could be transmitted and received, one frequency or frequency band for a different animal, to make the system workable for a plurality of animals.

Referring to FIG. 3, and in particular, to potentiometer 50 and potentiometer 60, another embodiment, containing adjustable signal circuitry and adjustable spike out circuitry, is provided. The potentiometers 50 and 60 enable the user to individually customize an animal's collar detector unit sensitivity. This feature is desirable because some animals, for example trained animals, are less likely to leave the confinement area. In contrast, untrained animals are likely to need increased monitoring and deterrence to prevent the animal from leaving the confinement area. As a result, the owner would desire to lower the unit's sensitivity for a trained animal, while increasing the unit's sensitivity for an untrained animal.

In addition, the amount of spike out deterrent may be varied. As a result, the amount of current applied as a deterrence is variable. For example, dobermans are highly sensitive to electrical shocks. Thus, a lower spike out deterrent provides a suitable deterrent. Alternatively, rottweilers are not deterred by lower spike out levels. Accordingly, an elevated spike out deterrence is desirable. This feature is desirable because some animals need less of a deterrent to be contained within the predetermined confinement area, while some animals need more.

In FIG. 3, potentiometer 50 is coupled to detector 49, thereby allowing the user to increase or decrease the sensitivity of detector 49 to the outer perimeter's deterrent signal. Thus, the user can vary the strength of the modulated signal (A) that is necessary to activate detector 49. Potentiometer 60 is connected to the spike out circuit 59, thereby allowing the user to increase or decrease the level of the spike out deterrent to be sent to the animal. This circuitry may also be used when more than one animal is being contained within the predetermined confinement area.

Figure 4:
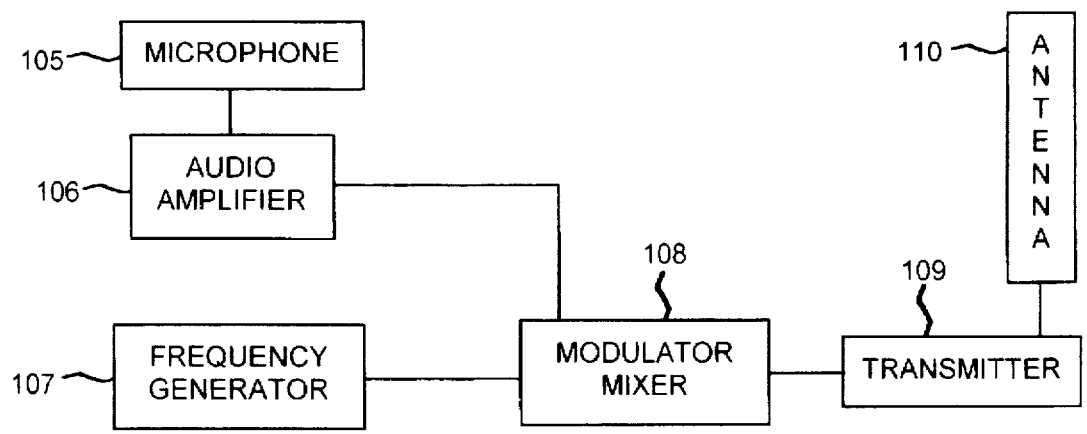
FIG. 4 is an exemplary circuit for a transmitter unit in accordance with an exemplary embodiment of the present invention.

FIG. 4, another exemplary embodiment, contains a collar communicator circuit for allowing the user to communicate with the animal via the receiver mounted on the animal's collar unit. This embodiment enables the animal's owner to communicate with the animal. FIG. 4 may be used as a stand-alone, hand-held unit which is easily transportable or may be integrated into the system of FIG. 2, with frequency generator 107, transmitter 109, and antenna 110 corresponding to frequency generator 21, transmitter 29, and antenna 31. In this arrangement, the modulator 108 mixer is coupled between frequency generator 107 and transmitter 109.

This embodiment is also portable and easily transportable, thereby permitting system mobility. For example, the owner is able to use the system to locate the animal even if the animal is out of range of the predetermined confinement area's antennas because the owner can travel with the transportable system.

FIG. 4 illustrates an embodiment of the transmitter unit 400. The transmitter unit 400 is small enough so that it may be either stationary or portable. The owner speaks directly into a microphone 105. The owner's voice is then electronically converted by the microphone 105 and amplified through an audio amplifier 106, as is well known. Frequency generator 107 creates a predetermined radio frequency (C) (for example, 99.5 KHz). The signal having frequency (C) is modulated and combined with the animal owner's electronically converted voice by a modulator mixer 108. The signal is then transmitted via a transmitter 109 and an antenna 110 to the receiver 11.

Figure 5:
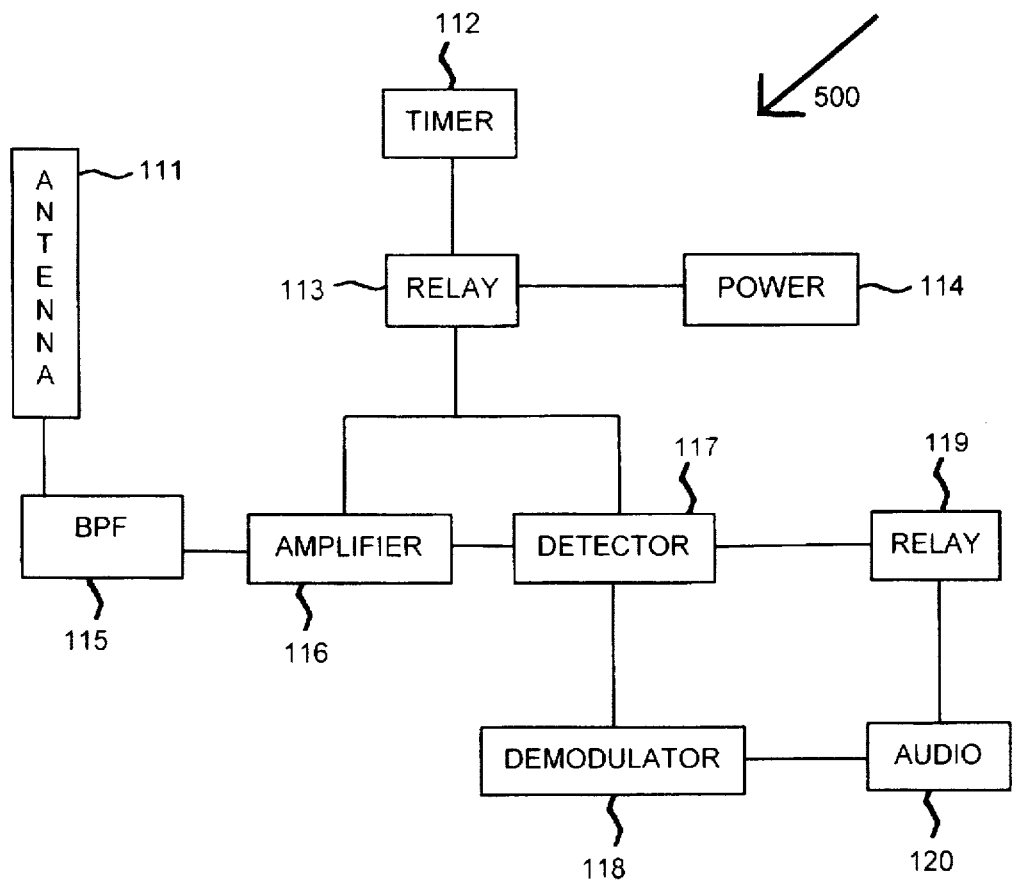
FIG. 5 is an exemplary communicator circuit of a receiver in accordance with an exemplary embodiment of the present invention.

In communicator circuitry 500, located in receiver 11, antenna 111, as shown in FIG. 5, receives all forms of radio signals, including frequency (C) sent from the transmitter unit 400. A timer 112 activates a relay 113 for a fraction of a second at predetermined timed intervals. Because the relay is activated for only a fraction of a second at regular intervals, and is not operating continuously, the battery life of the receiver unit is greatly increased.

The relay 113 allows power 114 to energize the detection circuitry, an amplifier 116 and a detector 117, of the communicator circuitry 500. When frequency (C) has been transmitted, band pass filter 115 allows frequency (C) (here, 99.5 KHz) or frequencies close to frequency (C) to pass through the bandpass filter. The amplifier 116 amplifies the received signal having frequency (C). In response to the presence of the signal having frequency (C), the detector 117 activates a relay 119 to energize audio 120 and demodulator 118, allowing the animal to hear the owner's voice. Antenna 111 may be incorporated as antenna 41 of the collar receiver unit of FIG. 3.

Figure 6:
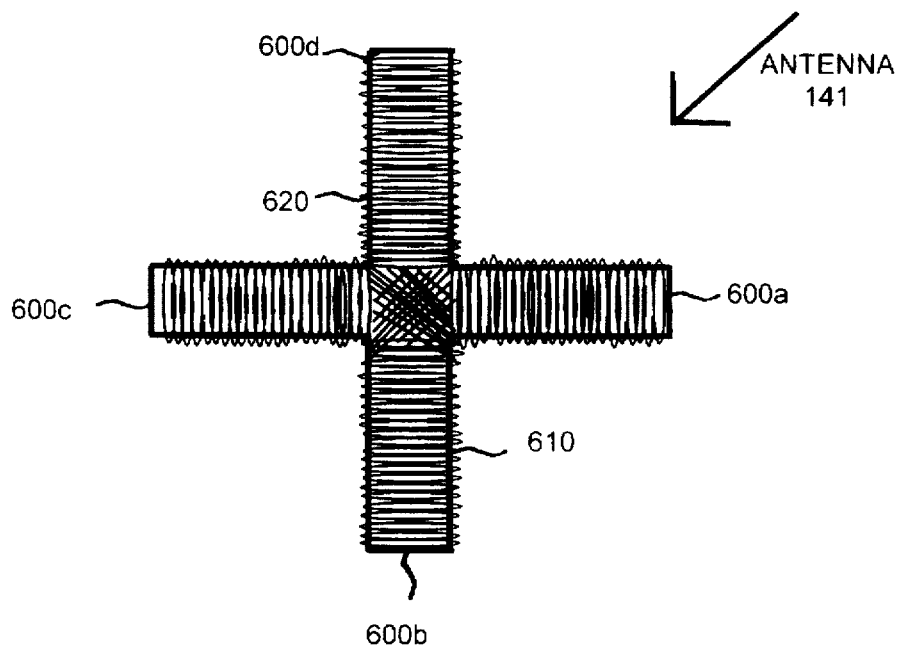
FIG. 6 is a schematic illustration of an exemplary antenna for the confinement system shown in FIG. 1.

FIG. 6 illustrates an exemplary antenna 141 which enables the user to maintain contact continuously with the animal, even when it is in motion and changes direction of travel. The antenna 141 eliminates the need for using multiple measuring circuits and detector circuits. It is a simple but highly functional design allowing the antenna to detect and transmit the required signals when the animal is in full and unrestrained movement.

The antenna 141 is a one-piece component that is comprised of one ferrite core 620 with four protruding legs 600a–600d at 90 degree angles to each other. Each of the four legs are wound with one continuous length of wire 610. The legs 600a14 600d of the antenna 141 are two dimensional, laying flat on a single plane. Because only one antenna is used, the size of the animal's receiver 11 is kept small. Furthermore, because no additional components are used, such as measuring circuits and comparator circuits, there is no increased drain on the battery. Finally, manufacturing costs remain low. The antenna 141 may be incorporated as antenna 41 of the collar receiver unit shown in FIG. 3.

Figure 7:
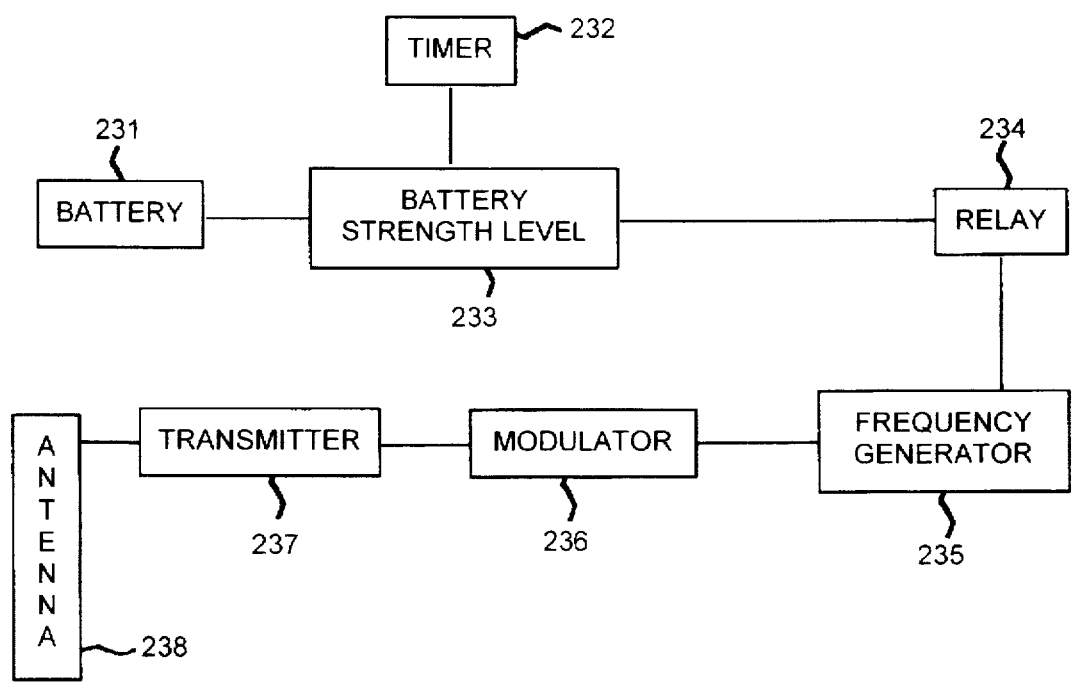
FIG. 7 is an exemplary circuit used in conjunction with the confinement system shown in FIG. 1.

Referring to FIG. 7, another embodiment, containing a low battery strength alarm, is provided. In this embodiment, the current level of the battery 231 in the receiver 11 is checked periodically for a low battery strength level. Either or both of wires 3 and 5 (see FIG. 1) may be used as receiving antenna(s) for receiving a signal (D), the low battery strength indicator signal. Recalling FIG. 1, an animal 7 to be kept within the predefined confinement area, determined by wire 3, wears a collar 9 that carries a receiver 11 for signal (D).

Referring to FIG. 7, a battery strength level indicator 233 measures the current level of battery 231 of the animal's receiver 11. To reduce the energy drainage of this circuit on the battery 231, a timer 232 activates this circuit at predetermined time intervals (for example, once every 4 hours). If the battery strength level indicator 233 reads a low current level from the battery 231, a relay 234 activates a frequency generator 235. The frequency generator 235 generates a low battery strength signal (D). A modulator 236 modulates the low battery strength signal (D) to the predetermined modulation level in accordance with the specific animal's receiver 11. A transmitter 237 transmits the low battery strength signal (D), with its proper modulation levels, through an antenna 238, to be received at the home base 1 by the user.

Figure 8:
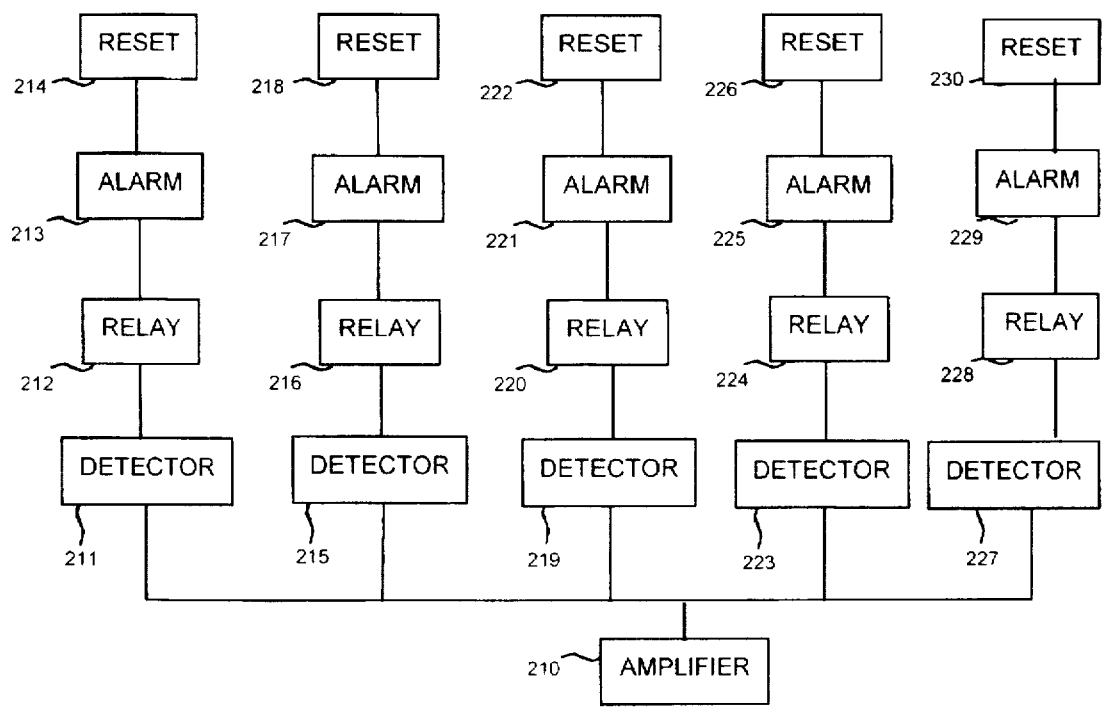
FIG. 8 is an exemplary circuit for determining and transmitting a low battery strength level from the animal's collar in accordance with the present invention.

FIG. 8 is an exemplary circuit for receiving the low battery strength signal (D) at the home base 1. An amplifier 210, which is the same as amplifier 32 in the circuit of FIG. 2, amplifies signal (D) up to 100 times, so as to energize the remainder of the circuit. A detector 211 is only activated by the modulated signal (D). Once the circuit verifies the intensity of signal (D) (a strength of between 0.001 and 0.005 watts) and the predetermined modulation level of signal (D) (between 0.01 KHz and 0.05 KHz), a relay 212 activates an alarm 213 to alert the owner of the low battery level in the animal's receiver 11.

As mentioned above, an aspect of this invention is that it is possible to utilize a configuration capable of indicating the imminent power failure of a particular animal's receiver 11 when more than one animal is confined in the same area. In this arrangement, the low battery strength signal (D) produced by each animal's receiver 11 will have a different level of modulation on signal (D). Whereas the detector 211 is searching for signal (D) with a modulation of between 0.01 KHz and 0.05 KHz, for example, a detector 215 may be searching for signal (D) with a modulation of between 0.06

KHz and 0.1 KHz, a detector 219 may be searching for signal (D) with a modulation of between 0.11 KHz and 0.15 KHz, a detector 223 may be searching for signal (D) with a modulation of between 0.16 KHz and 0.20 KHz, and a detector 227 may be searching for signal (D) with a modulation of between 0.21 KHz and 0.25 KHz.

Alarms 213, 217, 221, 225, and 229 are visible alarms such as light emitting diodes or flashing lights and/or audible alarms such as buzzers or whistles. Resets 214, 218, 222, 226, and 230 allow the user to deactivate the home base 1 alarms and reset the alarm and activate relays 212, 216, 220, 224 and 228 to a normal ready position.

In addition, although we have disclosed only a single modulated signal to be demodulated and compared at the receiver 11 of collar 9 for signal (A) for certain of the aforementioned embodiments, a plurality of modulating signals for modulating the carrier signal could be transmitted in signal (A) or from another confinement system and received, one modulating signal corresponding to a different animal, to make the system workable for a plurality of animals.

Finally, although the detectors are activated by first and second strength levels between 0.001–0.005 and 0.01–0.05 watts, other strength levels could be used.

Figure 9:
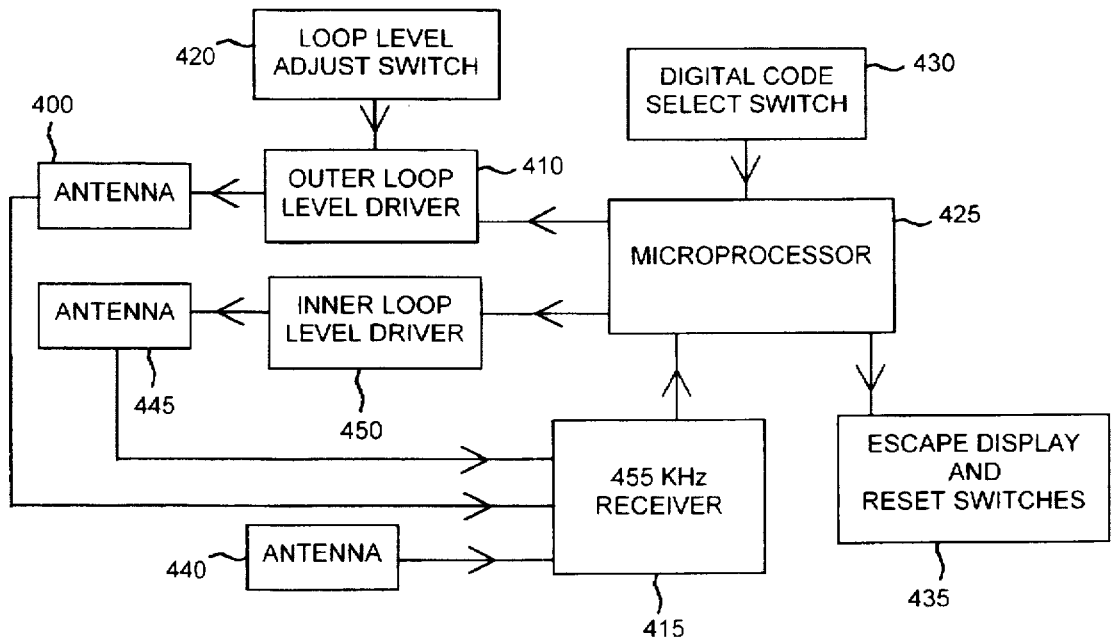
FIG. 9 is another exemplary circuit of a home base transmitter and alarm circuit utilizing a microprocessor in accordance with the present invention.
Figure 10:
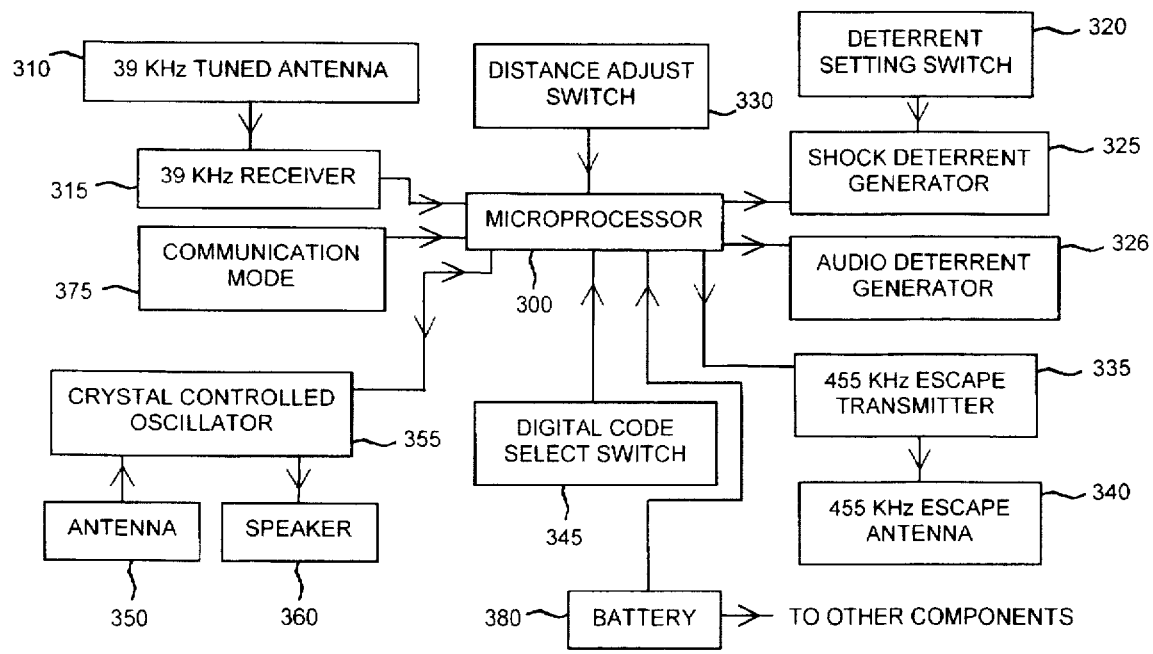
FIG. 10 is another exemplary circuit for a receiver utilizing a microprocessor in accordance with the present invention.

Another exemplary embodiment is shown in FIGS. 9 and 10. FIG. 9 is an alternate exemplary embodiment for the home base transmitter shown in FIG. 2. FIG. 10 is an alternate exemplary embodiment for receiver 11 shown in FIG. 3.

The embodiment shown in FIGS. 9 and 10 encodes the signals transmitted between the home base transmitter and the receiver 11 using a binary coded pulse sequence, a digital signal. Each receiver 11 is assigned one of a plurality of different binary coded pulse sequences as receiver identifiers. The binary codes are used to identify a particular receiver 11. Signals transmitted by receiver 11 are encoded with the binary code. The home base transmitter removes the binary code from the transmitted signal to identify which receiver 11 transmitted the signal. In this way, different receivers 11 can transmit on the same frequency.

For example, when an animal 7 escapes from the confinement area, the receiver 11 transmits a signal encoded with the binary code. The home base transmitter receives the encoded signal, removes the binary code, and activates an alarm. The home base transmitter also identifies which animal has escaped the confinement area.

Each home base transmitter also has a binary code pulse sequence which is added to the first, predetermined modulated signal (A). The binary code is used as a fence address. Receiver 11 receives the encoded signal (A) and removes the binary code. Receiver 11 is only responsive to the received encoded signal (A) which contains the fence address assigned to that particular receiver 11. Otherwise, receiver 11 is not responsive to the received encoded signal (A).

The microprocessor 425, shown in FIG. 9, controls the home base transmitter. Microprocessor 425 generates a binary coded pulse sequence which is added to the first, predetermined modulated signal (A) which is also generated by microprocessor 425. The microprocessor can be adjusted to transmit different binary coded pulse sequences using digital code select switch 430. The use of different binary coded pulse sequences allows multiple adjacent electronic confinement systems to operate at the same time.

Encoded signal (A) has a frequency of about 38.4 kHz. Encoded signal (A) is provided to outer loop level driver 410 which is a MOSFET high current driver. The outer loop level driver drives the antenna 400 to transmit the encoded signal (A). Antenna 400 corresponds to the first signal-emitting wire 3. The signal level produced by outer loop level driver 410 can be adjusted using loop level adjust switch 420.

Similarly, microprocessor 425 produces the second, predetermined modulated signal (B). Signal (B) is provided to the inner loop driver 450 which is a MOSFET high current driver. The inner loop level driver drives the antenna 445 to transmit signal (B). Antenna 445 corresponds to the second signal-emitting wire 5.

Figure 13:
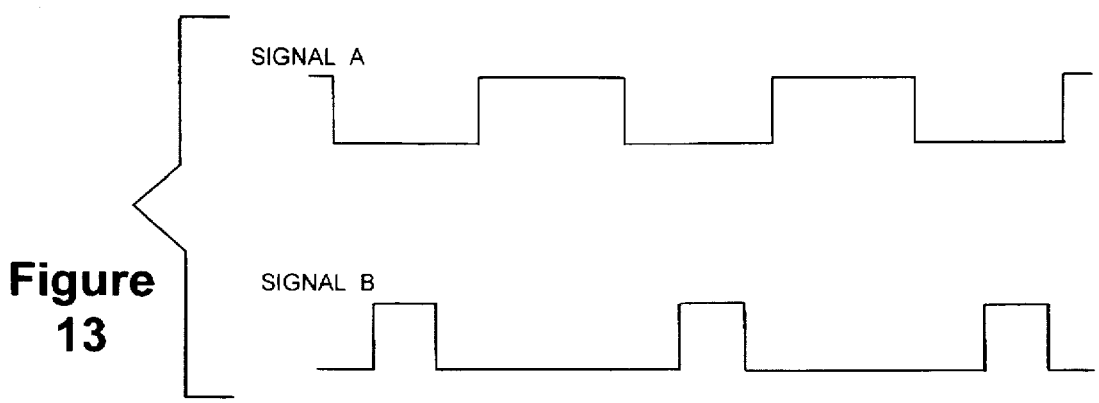
FIG. 13 is a signal diagram illustrating the signals transmitted by the home base transmitter shown in FIG. 9.

Microprocessor 425 modulates signals (A) and (B) as shown in FIG. 13. When modulated signal (A) is "on," modulated signal (B) is "off." When modulated signal (B) is "on," modulated signal A is "off." The time during which modulated signals (A) and (B) are "on" is different. Based on the difference in modulation, it can be determined if the received signal is signal (A) or signal (B). As a result, only one receiver tuned to a particular frequency is needed to receive both signals (A) and (B). Thus, the size of receiver 11 is minimized.

The home base transmitter also includes a 455 kHz receiver 415 which demodulates signals from antennas 400, 440, and 445. Antenna 440 is disposed in close proximity to the home base transmitter to detect transmissions from receiver 11 when the animal 7 is in close proximity to the home base transmitter. The 455 kHz receiver 415 is a Phillips NE614 receiver integrated circuit. The signals received by antennas 400, 440, and 445 are transmitted from receiver 11 and include binary codes having a rate of 1200 baud. The transmitted signals indicate whether animal 7 has left the confinement area or whether the battery 380, shown in FIG. 10, is at a low level.

Figure 11:
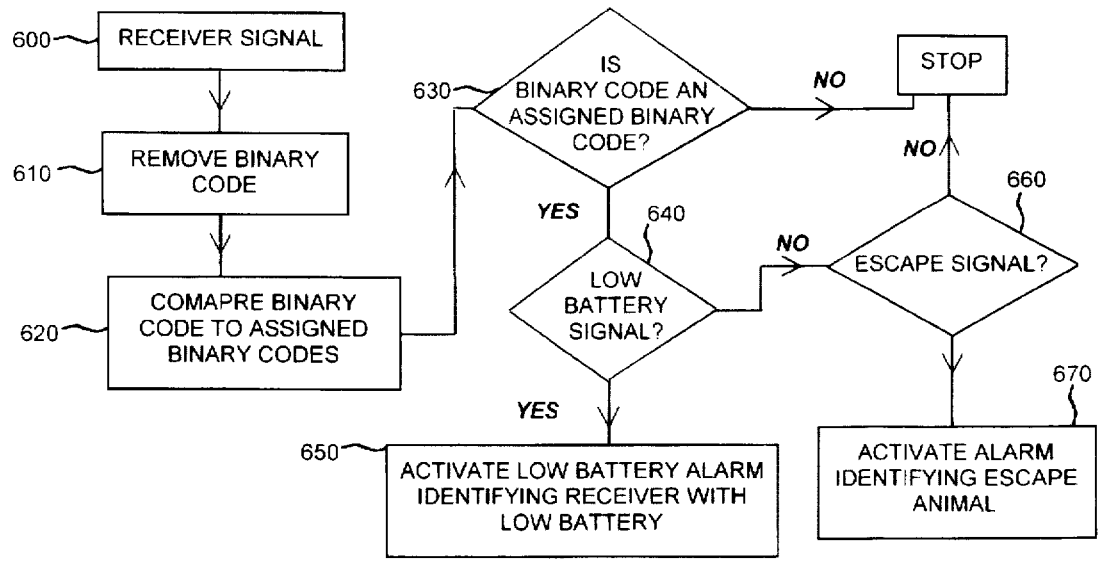
FIG. 11 is a flow chart illustrating the operation of the microprocessor in the home base transmitter shown in FIG. 9.

The operation of microprocessor 425 when receiving a signal from the home base transmitter is explained below with reference to FIGS. 9 and 11. The demodulated signal is provided, at step 600, to microprocessor 425 from 455 kHz receiver 415. Then, at step 610, the microprocessor 425 removes the binary code from the demodulated signal and compares, at step 620, the binary code to assigned binary codes. Microprocessor 415 has a table which includes a list of binary codes identifying the receivers assigned to that base station. The binary codes in the table are the assigned binary codes. Microprocessor 425 terminates processing if it is determined, at step 630, that the binary code from the received signal is not one of the assigned binary codes.

If the binary code is one of the assigned binary codes, microprocessor 425 determines, at step 640, whether the received signal has been transmitted because the battery 380, shown in FIG. 10, is low. The low battery alarm is activated, at step 650, if the signal indicates a low battery in receiver 11. The microprocessor also provides data to a display (not shown) to display which receiver 11 has the low battery 380.

Alternatively, if the signal does not indicate a low battery level, the microprocessor determines, at step 660, if the received signal indicates that animal 7 has escaped. Microprocessor 425 activates an alarm and displays a message on a 4 line, 16 character liquid crystal display on escape display and reset switches 435 shown in FIG. 9, at step 670, to identify which receiver 11 transmitted the digital code. This data is used to identify which animal 7 has escaped.

Figure 12:
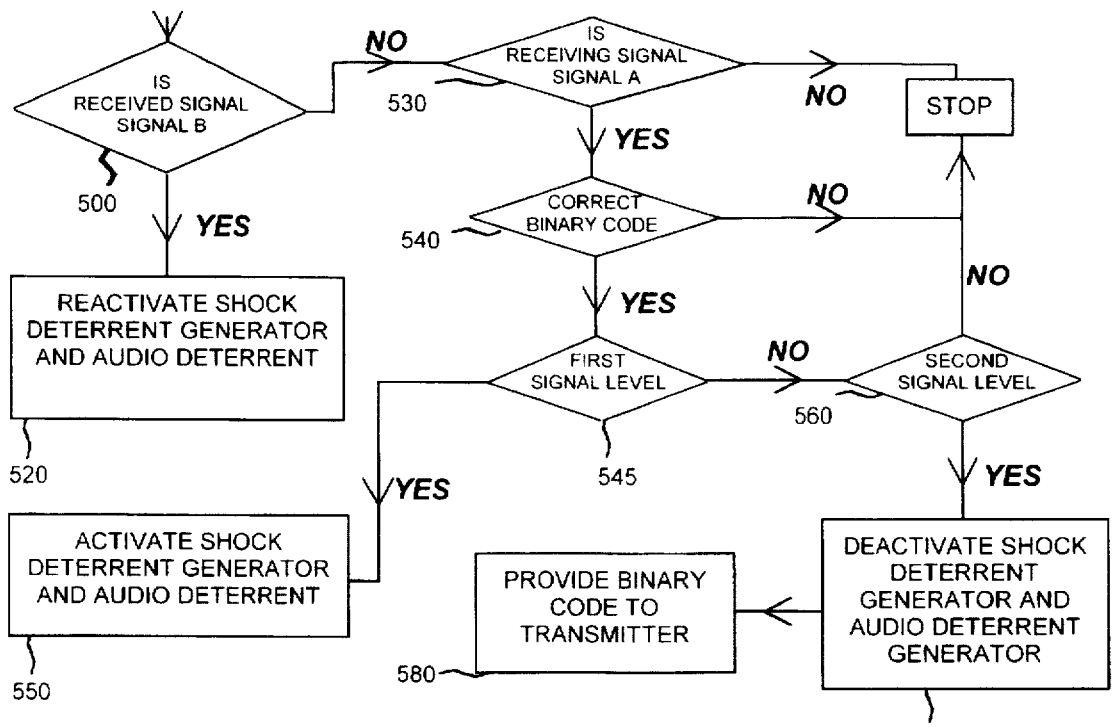
FIG. 12 is a flow chart illustrating the operation of the microprocessor in the receiver shown in FIG. 10.

Receiver 11 is explained below with reference to FIGS. 10 and 12. Receiver 11, as shown in FIG. 1, has a 39 KHz LC tuned antenna 310 which receives signals (A) and (B) from the home base transmitter. The antenna comprises an inductor wrapped on a ferrite core resonating with a capacitor. The received signal is provided to 39 kHz receiver 315 which demodulates and detects the strength level of the received signal, signal (A) or (B). In addition, 39 kHz receiver removes the binary code from demodulated signal (A'). 39 kHz receiver 315 provides the strength levels from signal (A) and (B) and the binary code from signal (A) to microprocessor 300. 39 kHz receiver 315 also identifies which signal, Signal (A) or (B), has been received. This data is provided to microprocessor 300.

Microprocessor 300 determines, at step 500, if the received signal is signal (B). If signal (B) has been received, shock deterrent generator 325 and the audio deterrent generator 326 are reactivated at step 520.

If the received signal is not signal (B), it is determined, at step 530, if the transmitted signal is signal (A). Next, it is determined, at step 540, whether the binary code from the signal corresponds to the fence address for receiver 11. The fence address is stored in the microprocessor. The binary code for the fence address can be changed between, for example, three different binary codes using digital code select switch 345. If the binary code is the correct fence address, then it is determined, at step 545, whether the signal strength of the received signal is at the level, between 0.001 and 0.005 watts, to initiate activation of the shock deterrent generator 325 and audio deterrent generator 326 at step 550. The deterrent level applied by the shock deterrent generator 325 to animal 7 can be adjusted using deterrent setting switch 320. If the level is correct, step 550 is initiated. If the signal level is not correct, it is then determined, at step 560, whether the signal strength is at a level, between 0.01 and 0.05 watts, to initiate, at step 570, deactivation of the shock deterrent generator 325 and audio deterrent generator 326. If neither level is satisfied, processing is terminated by microprocessor 300. In addition, if the correct binary code is not received or if the received signal is not signal (A), the microprocessor terminates processing.

The first and second signal strength levels can be adjusted using distance adjust switch 330. In addition, the strength of the shock deterrent can be adjusted using the deterrent setting switch.

Microprocessor 300 also provides a binary code to 455 kHz escape transmitter 335, at step 580, if animal 7 leaves the confinement area. 455 kHz escape transmitter 335 encodes a modulated signal which is transmitted from the receiver 11 via 455 kHz escape antenna 340 using the binary code. The home base transmitter, as discussed above, detects the transmitted signal, removes the binary code and displays which animal 7 has escaped as well as sounding an alarm.

Receiver 11 also includes an antenna 350, crystal controlled oscillator 355, and a speaker 360 for receiving voice transmissions from the home base transmitter or a portable transmitter as explained above. Crystal controlled oscillator 355 is controlled by microprocessor 300 to control the amount of power consumed. The voice receiver is either deactivated, activated on a periodic basis, or activated all the time. These three modes are selected by the microprocessor 300 in response to the switching of communication mode switch 375.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. An animal confinement arrangement comprising:

home base transmitting means for transmitting a digitally encoded signal from a first signal-emitting wire, the first signal-emitting wire disposed around a confinement area and the digitally encoded signal containing a specified digital signal;

receiver means for receiving the digitally encoded signal;

means for removing the specified digital signal from the digitally encoded signal and determining a signal strength of the transmitted digitally encoded signal; and deterrent means, in response to the specified digital code and the strength level, for producing a deterrent signal which is applied to an animal.

* * * * *

UNITED STATES PATENT AND TRADE MARK OFFICE
CERTIFICATE OF CORRECTION

PATENT NO. : 5,781,113
DATED : July 14, 1998
INVENTOR(S) : Yarnall, Sr. et al.

It is certified that error appears in the above-identified patent and that said Letters Patent is hereby corrected as shown below:

Column 1, line 39, delete "pules" and insert --pulses--.

Column 5, line 52, delete "," and insert --.--

Column 8, line 13, delete "600a 14 600d" and insert --600a - 600d--.

Signed and Sealed this

Twenty-third Day of March, 1999

*Attest:*

Q. TODD DICKINSON

*Attesting Officer*     *Acting Commissioner of Patents and Trademarks*